United States Patent [19]

Inglis et al.

[11] Patent Number: 4,805,317
[45] Date of Patent: Feb. 21, 1989

[54] MICROWAVE REGENERATION OF ADSORBENT MATERIALS FOR REUSE AS DRYING AGENTS

[75] Inventors: Robert S. Inglis, Mt. Airy, Md.; Owen Thomas, Reston, Va.

[73] Assignee: Airflow Company, Frederick, Md.

[21] Appl. No.: 120,433

[22] Filed: Nov. 13, 1987

[51] Int. Cl.⁴ .............................................. F26B 3/34
[52] U.S. Cl. ............................................. 34/1; 34/80
[58] Field of Search ................................ 34/1, 80, 88; 219/10.55 R, 10.55 M

[56] References Cited

U.S. PATENT DOCUMENTS

| | | | |
|---|---|---|---|
| 3,434,220 | 3/1969 | Forster | 34/1 |
| 3,643,054 | 2/1972 | Forster | 219/10.55 |
| 3,737,488 | 6/1973 | Porter et al. | |
| 3,771,234 | 11/1973 | Forster et al. | 34/1 |
| 3,834,038 | 9/1974 | Janda | 34/1 |
| 3,977,089 | 8/1976 | Forster et al. | 34/1 |
| 4,023,279 | 5/1977 | Janda | 34/1 |
| 4,055,001 | 10/1977 | Forster et al. | 34/1 |
| 4,169,848 | 2/1980 | Ko et al. | 34/80 X |
| 4,205,459 | 6/1980 | Koseki et al. | 34/80 X |
| 4,330,946 | 5/1982 | Courneya | 34/1 |
| 4,332,091 | 6/1982 | Bensussan et al. | 34/1 |
| 4,430,806 | 2/1984 | Hopkins | 34/1 |
| 4,475,295 | 10/1984 | Hussmann | 34/80 |
| 4,567,340 | 1/1986 | Latchum, Jr. | 34/1 X |
| 4,601,114 | 7/1986 | Noguchi | 34/80 X |

OTHER PUBLICATIONS

Swenson, "What They are Saying About Microwave Processing, Worldwide," Aoduchon Engineering, Jul. 1987, pp. 44-50.

Primary Examiner—Steven E. Warner
Attorney, Agent, or Firm—Nolte, Nolte and Hunter

[57] ABSTRACT

Porous desiccant material, such as silica gel, activated alumina, molecular sieves or mixtures thereof, is efficiently regenerated for reuse as a drying agent by irradiating a bed of the desiccant material with microwave energy preferably having a frequency of from 2400 MHz to 2500 MHz or from 900 to 915 MHz to heat and substantially affect only moisture adsorbed by the material and to vaporize the moisture in consequence of the heating of the moisture, the vaporized moisture being purged out of the bed with a forced draft of scavenging air while the bed undergoes irradiation by the microwave energy, and the resulting mixture of scavenging air and vapor being disposed of by discharging the mixture to an effluent receiving region isolated from the bed. As the moisture adsorbed on the pore, capillary and other surfaces of the desiccant material is preferentially heated by energy taken up from the microwave energy, moisture conversion from a liquid phase to a vapor phase is achieved directly, thereby to obviate raising the temperature of the desiccant material itself sufficiently to achieve the phase conversion of the adsorbate indirectly.

22 Claims, 3 Drawing Sheets

4,805,317

MICROWAVE REGENERATION OF ADSORBENT MATERIALS FOR REUSE AS DRYING AGENTS

FIELD OF THE INVENTION

This invention relates to the removal of adsorbed moisture from adsorbent materials in order to renew or regenerate their adsorptive potency and thereby render them reusable as drying agents for gaseous mixtures, particularly humid air.

BACKGROUND OF THE INVENTION

The obtaining of dry air through the use of desiccant dehumidifiers is well-known. These dehumidifiers utilize, as the desiccant, a porous adsorbent such as silica gel, activated alumina and molecular sieves, all of which have an enormous natural affinity for water. As humid air to be processed is passed through a permeable bed of the desiccant material in the dehumidifier, the moisture in the air is condensed out in the pores and capillaries of the desiccant material, and the latent heat of vaporization of the moisture condensed is converted to sensible heat, raising the temperature of the effluent air stream. Extremely low dew points can be obtained in this way, and it is apparently the simplest way of obtaining large volumes of dry air. At some point in time during its use as a drying agent in the dehumidifier, however, the desiccant material reaches a level of saturation with adsorbed moisture at which it requires renewal or regeneration of its adsorptive potency through removal of the adsorbed moisture, whereby it can be reused effectively as a drying agent. Thus, the known desiccant dehumidifiers are generally designed to carry out the required regeneration, either intermittently or continuously and concurrently with dehumidification.

One conventional dehumidifier/regenerator, designed for intermittent duty, has a stationary bed of desiccant material in a housing provided with a valving arrangement automatically controlled by a program timer such that air to be dehumidified or regeneration air from outdoors is moved through the desiccant bed at different times by a single blower. During the time period that regeneration air flows, an internal electrical resistance heater intercepts and heats the regeneration air as it enters the bed. This raises the regeneration air temperature to about 275° F. which then heats the desiccant material which, in turn, finally heats the adsorbed moisture from its liquid phase to a vapor phase. Thus, the desiccant material is utilized as a susceptor for transferring thermal energy by conduction to the adsorbate. The vapor is taken up by the flowing regeneration air and discharged therewith outdoors from the housing as effluent. Then, under control of the program timer, the electrical resistance heater is switched off and the flow of regeneration air from and to outdoors through the bed is continued for a few minutes to cool the hot desiccant material before switch-over of the valving arrangement for movement of the air to be dehumidified through the bed of regenerated desiccant material, hence for the commencement of dehumidification.

Another conventional dehumidifier/regenerator is designed for continuous duty and is a rotary type which is essentially divided into two parts. One part is a dehumidifying compartment in which humid air is passed through an adsorptively potent half or more of a continuously rotating bed of the desiccant material, where it is dried, and is then discharged to a controlled region requiring low humidity control of its atmosphere. As the desiccant bed becomes saturated, it passes into the other part of the dehumidifier, this being an adjoining regeneration compartment where, in the regeneration manner of the first-mentioned design, outside air is heated by an electrical resistance heater, passed through the desiccant bed to relieve the bed material of its adsorbed moisture, and discharged back to the outside atmosphere as a hot moist air effluent. The bed material is regenerated at the same rate at which it was being saturated in the dehumidifying compartment, so that the quality of the dry air discharged from the dehumidifying compartment to the controlled region is constant. The relative movement between the bed and the compartments, of course, may be carried out with rotation of the compartments instead of the bed.

Each of these conventional designs has been modified heretofore by replacing its electrical resistance heater with steam coils or with a direct-fired or indirect-fired gas or oil burner. The heated regeneration air, in any case, still first heats the saturated desiccant material, whereafter the hot desiccant material transfers some of the heat to the adsorbed or surface moisture in its pores and capillaries so as to vaporize the moisture. After the vapor is purged from the bed, it moreover still becomes necessary to cool the regenerated, yet hot, bed material. Thus, it is evident that a considerable expenditure of energy and time is necessary for carrying out the regeneration of desiccant material used in desiccant dehumidifiers of, or functionally similar to, the foregoing conventional designs. This poses a problem as to how one might carry out such desiccant regeneration much more efficiently, so that a highly significant reduction in the expenditure of energy and time will be achieved in the regeneration process.

The use of microwave energy for heating, vaporizing and removing moisture from grains of plastic resins to be used in molding processes, or from grains of organic material to be used in food or agricultural products, is taught in U.S. Pat. Nos. 3,834,038; 4,023,279; 4,330,946; 4,332,091; and 4,430,806. Of these, only U.S. Pat. No. 4,023,279 mentions a desiccant bed and his is solely in connection with its suggested use for supplying hot dry air said to be essential for picking up moisture vaporized out of wet resin particles by microwave energy as the particles drop from a hopper counter-current to the air. In fact, U.S. Pat. No. 4,023,279 teaches that drying resin particles by microwave energy and hot dry air eliminates the need, within the enclave of the drier, of a desiccant bed having the disadvantage of losing its effectiveness after saturation.

SUMMARY OF THE INVENTION

The principal aim of the invention is to provide an improved, more efficient, and less energy and time consuming method of, and apparatus for, removing adsorbed moisture from adsorbent materials in order to regenerate their adsorptive potency and thereby render them reusable as drying agents for gaseous mixtures, particularly humid air.

This aim is achieved, in accordance with one aspect of the invention, by a method of regenerating porous desiccant material for reuse as a drying agent, comprising the steps of: irradiating a bed of the desiccant material with microwave energy to heat moisture adsorbed by the material and to vaporize the moisture in consequence of the heating thereof; purging the vaporized moisture from the material with blown scavenging air while the bed undergoes irradiation by the microwave energy; and discharging the purged vaporized moisture in admixture with the scavenging air to an effluent receiving region isolated from the bed.

The blown scavenging air, while enroute to the bed of desiccant material undergoing irradiation, may be preheated by conducting the air in heat exchanging relation to and past a heat producing source of the microwave energy, whereby the source will be cooled at the same time. The temperature of the scavenging air for purging is considerably less than the vaporization temperature of the adsorbate and an optimum value thereof may be empirically determined. If this optimum temperature, typically but not necessarily about 120° F., is not reached from the ongoing heat exchange with the source of microwave energy, an auxiliary preheater such as an electrical resistance type may be provided upstream of the source and in the path of the scavenging air to the source. As the material deep in a thick bed may still be active at the start of the regeneration process, it may have a tendency during the process to adsorb moisture purged by the scavenging air from the shallower material This tendency, however, is thwarted by the considerably lower than vaporization level temperature of the scavenging air.

The irradiating, purging and discharging steps may be carried out in a dynamic desiccant-type dehumidifier apparatus during a regenerating mode of operation to which the apparatus is intermittently switched from a dehumidifying mode of operation Alternatively, such steps may be carried out in a regenerating chamber of a dynamic desiccant-type dehumidifier apparatus while the bed is being continuously moved through the regenerating chamber by, for example, being continuously rotated at a given angular rate through the regenerating chamber about an axis oriented with respect to the regenerating chamber and an adjacent dehumidifying chamber of the apparatus so that the bed is caused by its continuous movement to leave the regenerating chamber with regenerated bed material and to enter the dehumidifying chamber for use therein of the regenerated bed material as a drying agent until the continuous movement of the bed causes it to leave the dehumidifying chamber with adsorbed moisture and reenter the regeneration chamber for regeneration of the bed material.

According to another aspect of the invention, there is provided in a method of regenerating a porous adsorptive drying agent, in which the drying agent, after it has reached a given level of moisture saturation, is replaced by a newly regenerated like drying agent while it is itself regenerated, the improvement comprising regenerating the drying agent in each instance by thermally vaporizing its adsorbed moisture with microwave energy directly affecting the adsorbed moisture; and concomitantly purging the vaporized moisture from the drying agent with a forced air draft which is discharged with the purged vapor to an effluent receiving region isolated from the drying agent.

According to yet another aspect of the invention, there is provided in a continuous duty desiccant dehumidifier having a dehumidifying compartment adjoining a regenerating compartment, in which humid air is dried in the dehumidifying compartment by passing it to and about an adsorptively potent half or more of a continuously moving bed of desiccant material and is then discharged to a controlled region requiring low humidity control of its atmosphere, and in which, as the desiccant bed becomes saturated, the bed moves into the regenerating compartment to be relieved of its adsorbed moisture by vaporizing the moisture and carrying off the vapor in outside air passed to and about the bed and discharged back to the outside atmosphere, the bed material being regenerated at the same rate at which it was being saturated in the dehumidifying compartment; the improvement comprising the provision of microwave generating means arranged to irradiate the saturated desiccant bed in the regenerating compartment with microwave energy to vaporize the moisture adsorbed by the desiccant bed without substantially affecting the desiccant material itself, thermally or structurally, thereby to obviate heating the outside air sufficiently to heat the desiccant material to, in turn, heat and vaporize the adsorbed moisture, the sole function of the outside air thus being to carry off the vapor directly produced by the microwave radiation.

BRIEF DESCRIPTION OF THE DRAWINGS

In order that the invention may be more fully understood, it will now be described in conjunction with the accompanying drawings, in which.

DETAILED DESCRIPTION OF THE INVENTION

Figure 1:
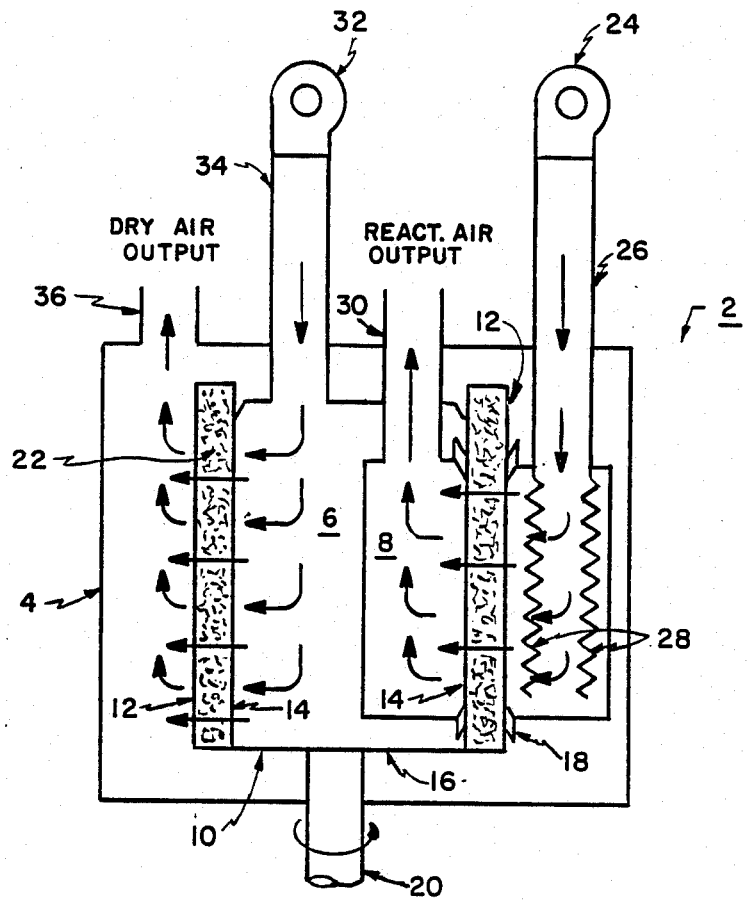
FIG. 1 schematically illustrates a prior art continuous duty desiccant dehumidifier.

Referring to FIG. 1, a prior art continuous duty desiccant dehumidifier 2 manufactured by applicants' assignee, Airflow Company of Frederick, Md. under the designation Series RC, is schematically illustrated. An outer housing 4 of dehumidifier 2 is internally subdivided into a dehumidifying compartment 6 and a regenerating compartment 8.

As further indicated in FIG. 1, a drum 10 is vertically disposed in housing 4 and is defined by an outer cylindrical wall 12 and an inner cylindrical wall 14, both walls extending upwardly from a closed bottom 16 of drum 10 and being in spaced coaxial relation to one another. An arcuate half sector or more of walls 12 and 14 resides in dehumidifying compartment 6, while the remaining arcuate sector portion resides in regenerating compartment 8. Compartments 6 and 8 are isolated from one another by long-lasting silicone rubber cushion seals 18. Drum 10 is mounted on a shaft 20 extending downwardly from bottom 16; and, in operation of dehumidifier 2, drum 10 is slowly rotated at a given angular rate by a drive mechanism (not shown) coupled to shaft 20.

Outer and inner cylindrical walls 12 and 14 are perforated so as to be pervious to air; and, in use of dehumidifier 2, the space between walls 12 and 14 is filled with porous desiccant material 22, such as silica gel which is inert, non-corrosive, non-toxic and pure in state (by commercial standards) and thus ideally suited for the use intended. Thus, drum 10 provides a desiccant bed rotatable through dehumidifying compartment 6 and regenerating compartment 8 of outer housing 4. As saturated bed material 22 enters regenerating compartment 8 from dehumidifying compartment 6, regeneration air from the outside atmosphere is blown through the saturated bed material 22 by a blower 24 via a duct 26 connected to a heating zone of regenerating compartment 8 outboard of drum walls 12 and 14. In the heating zone, the regeneration air intercepts energized electrical resistance heating elements 28 which raise its temperature to about 275° F., so that while passing through the saturated bed material 22 the regeneration air is sufficiently hot to heat material 22 to, in turn, heat and vaporize the adsorbed moisture in material 22. In the course of its through passage, the regeneration air picks up the vapor boiled out of the pores and capillaries of the air heated material 22, and the resulting hot, moist effluent is discharged back to the outside atmosphere via an outlet duct 30 connected to a discharge zone of regenerating compartment 8 inboard of drum walls 12 and 14.

With further reference to FIG. 1, as dry bed material 22 enters dehumidifying compartment 6 from regenerating compartment 8, moist air to be dehumidified is blown through dry bed material 22 by a blower 32 via a duct 34 connected to an input zone of dehumidifying compartment 6 inboard of drum walls 12 and 14. In the course of its through passage, the air to be dehumidified is relieved of its moisture by dry bed material 22, and the resulting dry air product is discharged via an outlet duct 36 to a controlled region requiring low humidity control of its atmosphere, duct 36 being connected to a discharge zone of dehumidifying compartment 6 outboard of drum walls 12 and 14.

Reference will now be made to the modified form 37 shown in FIG. 2 of the prior art continuous duty desiccant dehumidifier 2 shown in FIG. 1, elements common to FIG. 1 and FIG. 2 being identified in each by the same reference numerals.

Figure 2:
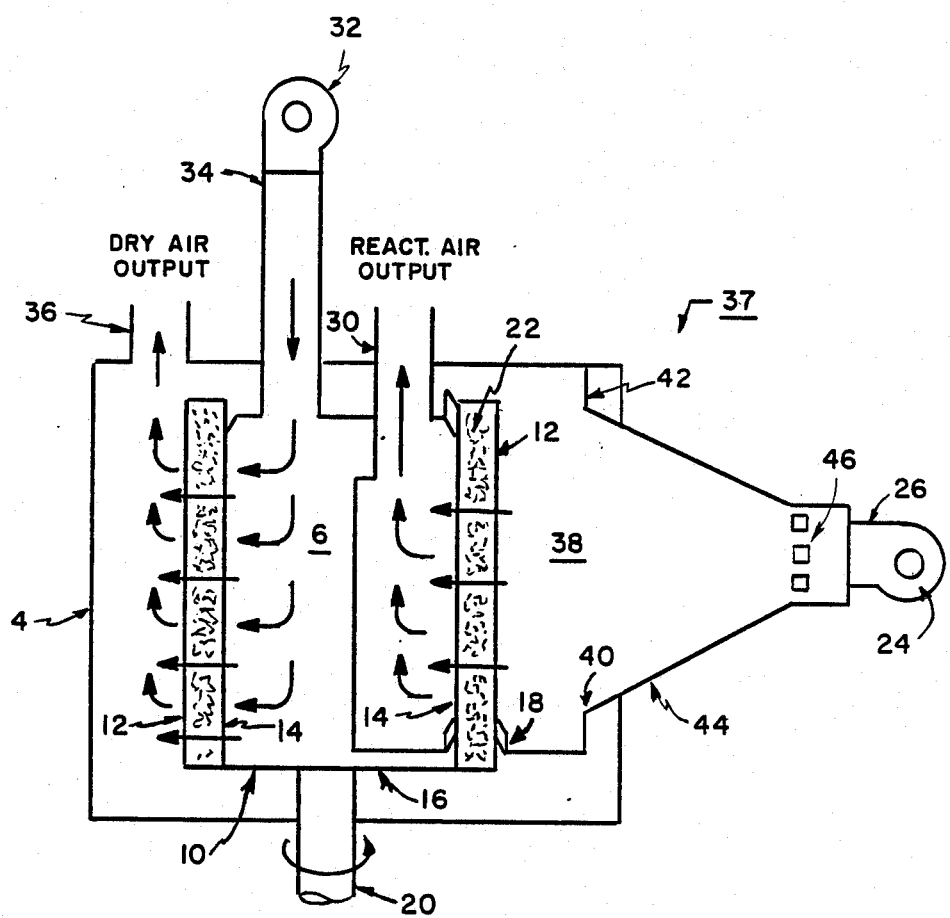
FIG. 2 schematically illustrates a modified form of the FIG. 1 dehumidifier constituting both a preferred means for carrying out the method aspects of the present invention and a preferred embodiment of the invention in its apparatus aspects.

The modifications represented in FIG. 2 are specifically concerned with inventive improvements in or relating to the regeneration of saturated desiccant material 22. In this connection, a modified regenerating compartment 38 within outer housing 4 is provided with an opening 40 in an outboard sidewall 42 thereof, to which is coupled the output end of a hollow waveguide 44 extending into housing 4 from an externally located array of microwave generators 46 arranged to feed the input end of waveguide 44 with microwave energy having a frequency of about 2450 MHz or 915 MHz, these being the microwave frequencies federally assigned for residential and industrial oven use, respectively, as opposed to microwave frequencies federally assigned for broadcast and other uses. Although either 2450 MHz or 915 MHz will produce the desired moisture vaporizing effect, practical considerations tend to favor use of the latter. Blower 24 and its associated conduit 26 have been moved from their FIG. 1 locations so that, in FIG. 2, blower 24 provides a forced draft of scavenging air from the outside atmosphere via duct 26 in a path over and about microwave generators 46, thence via hollow waveguide 44 into regenerating compartment 38 for onward passage to and about saturated desiccant material 22 therein and discharge back to the outside atmosphere via outlet duct 30. Other wall 12 and inner wall 14 of desiccant drum 10, apart from being perforated, are made of microwave transparent material and are thus pervious both to air and microwave energy. Alternatively, inner wall 14 may be made reflective of microwave energy, in which case only outer wall 12 will be microwave transparent; or, with both walls 12 and 14 remaining microwave transparent, the inboard wall of regenerating compartment 38 may be made reflective of microwave energy.

By this arrangement, desiccant material 22 in regenerating compartment 38 is irradiated with microwave energy having a frequency known to heat the moisture adsorbed by the material and to vaporize the moisture in consequence of the heating thereof, the vaporized moisture being purged from the material by the blown scavenging air while the material undergoes irradiation by the microwave energy. The path of the scavenging air over and about microwave generators 46 brings the scavenging air into a heat exchanging relationship with the microwave generators, so that heat from the microwave generators is transferred to the scavenging air to raise its temperature to a level considerably less than the vaporization level of the moisture. Blower 24 may, however, provide outside scavenging air directly into regenerating compartment 38 should preheating of the air not be desired; or, if preheating is desired, it may be effected alternatively by introducing the outside scavenging air to compartment 38 by way of a directly connected duct thereto, such as duct 26 (FIG. 1) having electrical resistance heaters (FIG. 1) disposed therein externally of compartment 38 instead of within it. Other types of dedicated preheaters would be similarly effective.

By controlling the speed at which desiccant drum 10 is rotated by drive shaft 20, desiccant material 22 in regenerating compartment 38 is regenerated at the same rate at which it was being saturated in dehumidifying compartment 6. The microwave energy vaporizes the moisture adsorbed by desiccant material 22 without substantially affecting the material itself, either thermally or structurally, thereby obviating the prior art technique employed in the FIG. 1 dehumidifier of heating the outside air sufficiently to heat desiccant material 22 to, in turn, heat and vaporize the adsorbed moisture. Thus, in the improved FIG. 2 dehumidifier 37, the sole function of the outside air is to purge desiccant material 22 concomitantly with the microwave irradiation thereof in order to carry off the vapor directly produced by such irradiation.

Figure 3:
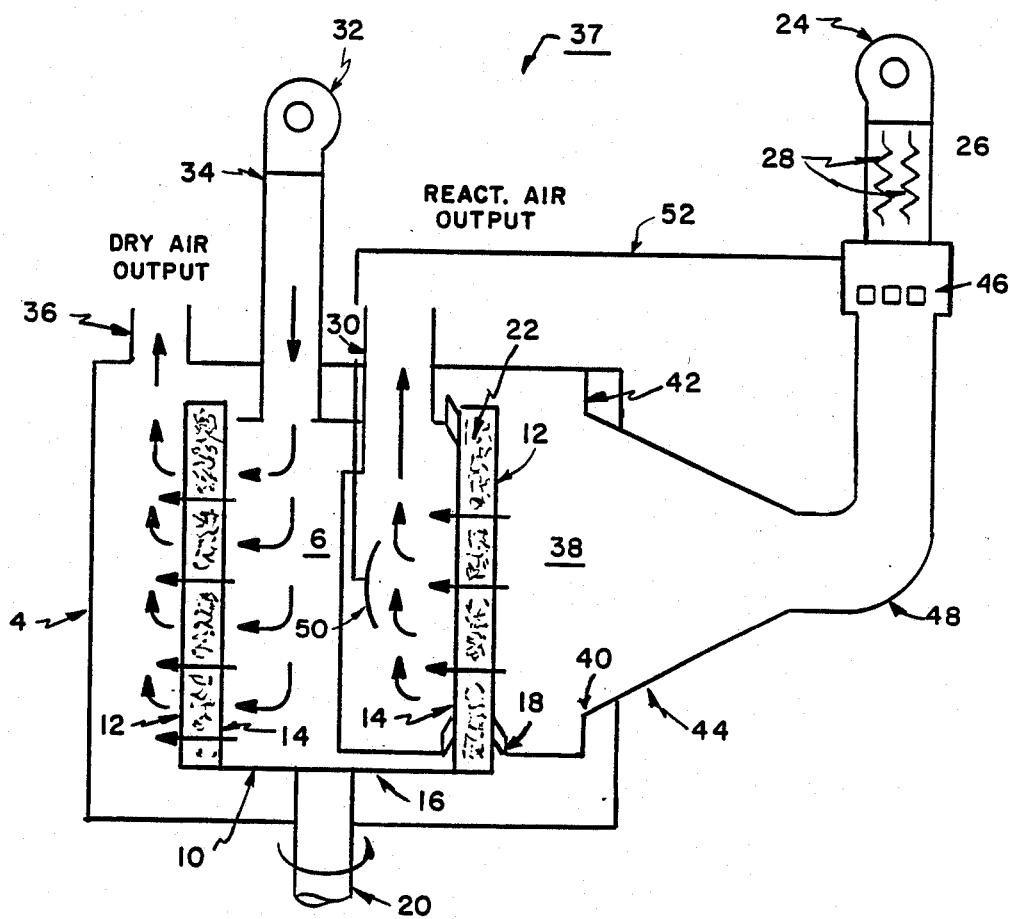
FIG. 3 is similar to FIG. 2 except for depicting an auxiliary preheating means for the scavenging air, an alternative waveguide formation for the microwave generating means, and the addition of a feedback power control arrangement for the microwave generating means.

Referring now to FIG. 3, a variant 37' of dehumidifier 37 of FIG. 2 is depicted which constitutes a further embodiment of the invention. It will be seen that hollow waveguide 44 of dehumidifier 37' merges at its energy receiving end with a 90° hollow waveguide bend 48 terminating at the output of microwave generators 46. Thus, the direction of the path of the microwave energy enroute to regeneration compartment 38 is changed, thereby to facilitate a location of microwave generators 46 vertically and horizontally offset from that shown in FIG. 2. Other bends, not necessarily 90°, can be readily utilized, if desired.

Further apparent from FIG. 3, when compared with FIG. 2, is that duct 26, through which blower 24 provides a forced draft of scavenging air from the outside atmosphere in a path over and about microwave generators 46, contains electrical resistance heating elements 28' similar to elements 28 of FIG. 1. This feature of FIG. 3 provides auxiliary preheating means energizable to augment the preheating realized from the ongoing heat exchange between microwave generators 46 and the scavenging air. Hence, should the temperature of the scavenging air entering regenerating compartment 38 for purging be less than optimum, e.g., less than typically about 120° F., the auxiliary preheating means comprising electrical resistance heating elements 28' may be energized to achieve a desired incremental increase in temperature, the final or optimum value of the temperature being considerably less in either case than the vaporization temperature of the adsorbate in desiccant material 22.

Also to be seen in FIG. 3 is a microwave receiving antenna 50 disposed in regeneration compartment 38 proximate to and facing inner wall 14 therein of drum 10 so as to receive microwave energy that has irradiated desiccant material 22 and couple it back in power controlling relation to microwave generators 46 via a transmission line 52. By this arrangement, as desiccant material 22 becomes progressively drier and accordingly has less adsorbate to which microwave energy can be transferred for vaporizing the adsorbate, progressively more microwave energy is received by antenna 50 and serves in negative feedback fashion to reduce the energy output of microwave generators 46, thereby to conserve the expenditure of power and add to the efficiency of the regeneration operation. Thus, feedback of microwave energy is utilized for modulating the energy input to desiccant material 22 as a function of moisture loading in order to maximize efficiency. Microwave receiving antenna 50 may be a reflector type, as schematically represented in FIG. 3, or a horn type or even a lens type. Transmission line 52 may be any suitable waveguide, but is preferably a coaxial cable owing to the ease with which such a cable can be run between antenna 50 and the feedback-responsive power control circuitry of microwave generators 46, as exemplified in the FIG. 3 schematic showing of transmission line 52 leaving stationary regeneration compartment 38 by way of air outlet duct 30 which is fixed to the compartment.

It will be appreciated that negative feedback control of microwave generators 46 may instead be carried out with the aid of a microwave detector disposed in regeneration compartment 38 to receive the microwave energy that has irradiated desiccant material 22. A crystal detector is one of the most effective such detectors, as it converts the microwave field intensity into an average current which may be used for control purposes. A bolometer is another microwave detector that may be applied to the task, as it changes resistance with temperature which is a function of absorbed microwave energy and thus can be used as an arm of a resistance bridge circuit for obtaining a control voltage or current.

In FIGS. 2 and 3, microwave generators 46 are preferably continuous-wave magnetrons of the type commonly employed in microwave ovens. While an array of three such generators 46 is depicted, multiple generators are not essential and, in fact, a single suitable conventional microwave generator could readily be substituted. The use of multiple generators, however, avoids the high cost associated with a large, high K.W. microwave generator.

As in any microwave environment, unsafe microwave leakage is to be avoided; and, as leakage preventing means are well-known and readily adaptable for use in modified dehumidifier 37 and its variant 37', such means have been omitted from the schematic illustrations in FIGS. 2 and 3, although their use in practice is to be presumed.

As compared to the prior art, the regenerating method and continuous duty desiccant dehumidifier according to the invention reduce the energy required, reduce the time required to accomplish desiccant regeneration, improve the overall efficiency of the drying system, eliminate or reduce cool-down time, reduce the discharge temperature of the dehumidified air and provide an order of magnitude improvement in the cost of providing dehumidified air.

What is claimed is:

1. A method of regenerating porous desiccant material for reuse as a drying agent, said method comprising the steps of:
    (a) irradiating a bed of the desiccant material with microwave energy to heat moisture adsorbed by said material and to vaporize said moisture in consequence of the heating thereof;
    (b) purging the vaporized moisture from the bed with blown scavenging air while said bed undergoes irradiation by said microwave energy;
    (c) discharging the purged vaporized moisture in admixture with said scavenging air to an effluent receiving region isolated from said bed;
    (d) preheating the blown scavenging air enroute to the bed of desiccant material to a temperature, e.g., about 120° F., which is considerably below the vaporization level of said moisture adsorbed by said material.

2. A method according to claim 1, wherein said microwave energy is generated at a selected frequency in one of the ranges of from 2400 to 2500 MHz and from 900 to 915 MHz.

3. A method according to claim 1, wherein the desiccant material is selected from the group consisting of silica gel, activated alumina, molecular sieves and mixtures thereof.

4. A method according to claim 1, wherein the level of the microwave energy irradiating said bed of desiccant material is progressively reduced as the regeneration of said material proceeds.

5. A method according to claim 1, wherein the microwave energy thermally vaporizing the adsorbed moisture of the drying agent is progressively reduced as the regeneration said drying agent proceeds.

6. A method according to claim 1, wherein the irradiating, purging and discharging steps are carried out in a dynamic desiccant-type dehumidifier apparatus during a regenerating mode of operation to which said apparatus is intermittently switched from a dehumidifying mode of operation.

7. A method according to claim 6, wherein the bed of regenerated desiccant material resulting from the irradiating, purging and discharging steps carried out during said regenerating mode of operation of said dehumidifier apparatus is utilized during said dehumidifying mode of operation thereof for removing moisture from other air blown to and about said bed enroute to a controlled region requiring low humidity control of its atmosphere.

8. A method according to claim 1, wherein the irradiating, purging and discharging steps are carried out in a regenerating chamber of a dynamic desiccant-type dehumidifier apparatus while said bed is being continuously moved at a given rate through said regenerating chamber, the bed being caused by its continuous movement to leave said regenerating chamber with regenerated bed material and to enter an adjacent dehumidifying chamber of said apparatus for use therein of said regenerated bed material as a drying agent until the continuous movement of the bed causes it to leave said dehumidifying chamber with adsorbed moisture and reenter said regeneration chamber for regeneration of the bed material.

9. A method according to claim 8, wherein said continuous movement of the bed is a continuous rotational movement of the bed about an axis of symmetry thereof.

10. A method according to claim 1, wherein the blown scavenging air enroute to the bed of desiccant material is conducted in heat exchanging relation to and past a heat producing source of said microwave energy for cooling said source and preheating said scavenging air at least towards achieving said temperature.

11. A method according to claim 10, wherein the preheating of said scavenging air by said microwave energy source is augmented by auxiliary preheating means in the path of said scavenging air upstream of said source to achieve, downstream of said source, said scavenging air temperature when it cannot by achieved with said source alone.

12. A method according to claim 10, wherein at least one change is made in the direction of propagation of the microwave energy between said energy source and said drying agent.

13. A method according to claim 10, wherein the preheated scavenging air is conducted to said bed of desiccant material from the source of microwave energy by way of a hollow waveguide which is simultaneously utilized to guide the microwave energy output of said source to said bed for the irradiation thereof.

14. In a continuous duty desiccant dehumidifier having a dehumidifying compartment adjoining a regenerating compartment, in which humid air is dried in the dehumidifying compartment by passing it to and about an adsorptively potent half or more of a continuously moving bed of desiccant material and is then discharged to a controlled region requiring low humidity control of its atmosphere; and in which, as the desiccant bed becomes saturated, said bed moved into the regenerating compartment to be relieved of its adsorbed moisture by vaporizing said moisture and carrying off the vapor in outside air passed to and about the bed and discharged back to the outside atmosphere, said bed material being regenerated at the same rate at which it was being saturated in the dehumidifying compartment;
  the improvement comprising the provision of microwave generating means arranged to irradiate the saturated desiccant bed in said regenerating compartment with microwave energy to vaporize the moisture adsorbed by the desiccant bed without substantially affecting the desiccant material itself, thermally or structurally, thereby to obviate heating the outside air sufficiently to heat the desiccant material to, in turn, heat and vaporize the adsorbed moisture, the sole function of the outside air thus being to carry off the vapor directly produced by the irradiating microwave energy;
  wherein said microwave generating means is disposed externally of said regenerating compartment, and wherein a hollow waveguide for guiding said microwave energy to irradiate said saturated desiccant bed is coupled between the output of said microwave generating means and an opening in an exterior wall of said regenerating compartment.

15. A dehumidifier according to claim 14, wherein said microwave generating means comprises at least one magnetron tuned to a frequency within one of the ranges of from 2400 MHz to 2500 MHz and from 900 to 915 MHz.

16. A dehumidifier according to claim 14, wherein said hollow waveguide includes at least one bend for changing the direction of propagation of said microwave energy between said generating means and said regenerating compartment.

17. A dehumidifier according to claim 14, wherein means are provided for reducing the microwave energy output of said microwave generating means as said desiccant bed is increasingly relieved of its adsorbed moisture.

18. A dehumidifier according to claim 14, wherein a blower for said passing of outside air to and about said saturated desiccant bed is disposed externally of said regenerating compartment, said blower being arranged to supply said outside air to said regenerating compartment by way of said hollow waveguide.

19. A dehumidifier according to claim 18, wherein said blower is connected to duct means arranged to direct said outside air in heat exchanging relation to said microwave generating means enroute to said hollow waveguide.

20. A dehumidifier according to claim 19, wherein said duct means contains auxiliary heating means for augmenting the heat exchanged from said microwave generating means to said outside air.

21. In a continuous duty desiccant dehumidifier having a dehumidifying compartment adjoining a regenerating compartment, in which humid air is dried in the dehumidifying compartment by passing it to and about an adsorptively potent half or more of a continuously moving bed of desiccant material and is then discharged to a controlled region requiring low humidity control of its atmosphere; and in which, as the desiccant bed becomes saturated, said bed moves into the regenerating compartment to be relieved of its adsorbed moisture by vaporizing said moisture and carrying off the vapor in outside air passed to and about the bed and discharged back to the outside atmosphere, said bed material being regenerated at the same rate at which it was being saturated in the dehumidifying compartment;
  the improvement comprising the provision of microwave generating means arranged to irradiate the saturated desiccant bed in said regenerating compartment with microwave energy to vaporize the moisture adsorbed by the desiccant bed without substantially affecting the desiccant material itself, thermally or structurally, thereby to obviate heating the outside air sufficiently to heat the desiccant material to, in turn, heat and vaporize the adsorbed moisture, the sole function of the outside air thus being to carry off the vapor directly produced by the irradiating microwave energy;
  wherein a blower is provided for passing said outside air to and about said irradiated bed, and wherein preheating means are provided intermediate said blower and said regenerating compartment for heating said outside air to a temperature substantially less than the vaporization temperature of the adsorbed moisture in said bed.

22. In a continuous duty desiccant dehumidifier having a dehumidifying compartment adjoining a regenerating compartment, in which humid air is dried in the dehumidifying compartment by passing it to and about an adsorptively potent half or more of a continuously moving bed of desiccant material and is then discharged to a controlled region requiring low humidity control of its atmosphere; and in which, as the desiccant bed becomes saturated, said bed moves into the regenerating compartment to be relieved of its adsorbed moisture by vaporizing said moisture and carrying off the vapor in outside air passed to and about the bed and discharged back to the outside atmosphere, said bed material being regenerated at the same rate at which it was being saturated in the dehumidifying compartment;

the improvement comprising the provision of microwave generating means arranged to irradiate the saturated desiccant bed in said regenerating compartment with microwave energy to vaporize the moisture adsorbed by the desiccant bed without substantially affecting the desiccant material itself, thermally or structurally, thereby to obviate heating the outside air sufficiently to heat the desiccant material to, in turn, heat and vaporize the adsorbed moisture, the sole function of the outside air thus being to carry off the vapor directly produced by the irradiating microwave energy;

wherein means are provided for reducing the microwave energy output of said microwave generating means as said desiccant bed is increasingly relieved of its adsorbed moisture;

wherein said output reducing means comprises a microwave receiving antenna disposed in said regenerating compartment for receiving microwave energy that has irradiated said desiccant bed, and a transmission line which interconnects said antenna with said microwave generating means for coupling the microwave energy received by said antenna in negative feedback power controlling relation to said microwave generating means.

* * * * *